United States Patent
Yeh et al.

(10) Patent No.: US 7,554,980 B1
(45) Date of Patent: Jun. 30, 2009

(54) PACKET CLASSIFICATION USING RELEVANCE SCORING

(75) Inventors: Chiang Yeh, Sierra Madre, CA (US); James Hitzelberger, Desert Hot Springs, CA (US)

(73) Assignee: Alcatel Lucent, Paris (FR)

( * ) Notice: Subject to any disclaimer, the term of this patent is extended or adjusted under 35 U.S.C. 154(b) by 1214 days.

(21) Appl. No.: 10/690,277

(22) Filed: Oct. 20, 2003

Related U.S. Application Data (60) Provisional application No. 60/419,783, filed on Oct. 18, 2002.

(51) Int. Cl.
  H04L 12/28 (2006.01)
  H04L 12/56 (2006.01)
(52) U.S. Cl. .......................................... 370/392; 707/1
(58) Field of Classification Search ................. 370/231, 370/254, 389, 390, 392, 468, 537; 382/253; 707/1
See application file for complete search history.

(56) References Cited

U.S. PATENT DOCUMENTS

| | | | | |
|---|---|---|---|---|
| 5,726,979 | A * | 3/1998 | Henderson et al. | 370/254 |
| 5,748,629 | A * | 5/1998 | Caldara et al. | 370/389 |
| 6,154,572 | A * | 11/2000 | Chaddha | 382/253 |
| 6,333,932 | B1 * | 12/2001 | Kobayasi et al. | 370/389 |
| 6,426,959 | B1 * | 7/2002 | Jacobson et al. | 370/468 |
| 6,587,463 | B1 * | 7/2003 | Hebb et al. | 370/392 |
| 6,633,592 | B1 * | 10/2003 | Takahashi | 370/537 |
| 6,707,817 | B1 * | 3/2004 | Kadambi et al. | 370/390 |
| 7,324,447 | B1 * | 1/2008 | Morford | 370/231 |
| 2003/0191740 | A1 * | 10/2003 | Stark | 707/1 |
| 2003/0231630 | A1 * | 12/2003 | Messenger | 370/392 |
| 2007/0086337 | A1 * | 4/2007 | Li et al. | 370/229 |

* cited by examiner

Primary Examiner—Kevin C Harper (57) ABSTRACT

A method and apparatus for performing multi-stage classification of a plurality of strings extracted from a packet, for example, is disclosed. The method causes a plurality of hierarchical tables to be searched, each table having criteria derived from the policies with which the packet is classified. One of the plurality of the strings is searched at each of the plurality of tables. Each match identified in one table is used to retrieve a pointer to a subsequent table. Each of the matches in each of the hierarchical tables is scored in order to generate a cumulative score for each policy, a score may be used to select from a plurality of applicable policies. In a first embodiment, a plurality of policies, as embodied in the hierarchical tables, are searched and the best policy selected. In a second embodiment, recursive searching is employed.

27 Claims, 6 Drawing Sheets

| | A | B | C | D | RULE |
|---|---|---|---|---|---|
| 506 → | A1 | B1 | C1 | D1 | R1 |
| 508 → | A1 | B1 | C1 | * | R2 |
| | A1 | B1 | * | * | R3 |
| | A1 | * | * | * | R4 |
| | A1 | * | C1 | D1 | R5 |
| | A1 | * | * | D1 | R6 |
| | A2 | B2 | C2 | D2 | R7 |
| | A2 | * | C2 | * | R8 |
| | A3 | * | C2 | D1 | R9 |
| | A3 | B1 | C2 | D2 | R10 |

FIG. 5A

| NIBBLE A | NIBBLE B | NIBBLE C | NIBBLE D | CUMM SCORE |
|---|---|---|---|---|
| 2 | 2 | 2 | 0 | -- |
| 2 | 2 | 2 | 1 | 7 |
| 2 | 2 | 1 | 1 | 6 |
| 2 | 1 | 1 | 1 | 5 |
| 2 | 1 | 1 | 0 | -- |
| 2 | 1 | 1 | 0 | -- |
| 0 | -- | -- | -- | -- |
| 0 | -- | -- | -- | -- |
| 0 | -- | -- | -- | -- |
| 0 | -- | -- | -- | -- |

PACKET CLASSIFICATION USING RELEVANCE SCORING

CROSS-REFERENCE TO RELATED APPLICATION

This application claims priority from the following U.S. Provisional patent application, the disclosure of which, including all appendices and all attached documents, is hereby incorporated herein by reference in its entirety for all purposes: U.S. Provisional Patent Application Ser. No. 60/419,783, to Chiang Yeh and James Hitzelberger, entitled, "PACKET CLASSIFICATION USING RELEVANCE SCORING," filed Oct. 18, 2002.

BACKGROUND

The present invention generally relates to a system for searching a plurality of strings necessary to classifying a protocol data unit (PDU). In particular, the invention relates to a method and apparatus for structuring the criteria of a plurality of rules in hierarchical tables and searching each table with a string extracted from the table for purposes of identifying a match and an associated pointer into the next hierarchical table.

In a packet switched network, PDUs are transmitted from node to node between the source node and destination node. At various intermediate nodes, the PDUs are inspected for purposes of making a processing decision for the PDU under inspection. In various network devices including switches and routers, for example, multiple strings, i.e. nibbles comprising one or more bits, are extracted from the PDU in order to classify the PDU. The policies used to classify the traffic may number in the thousands and such a magnitude imposes a heavy burden on the network device. The burden presents the greatest challenge to modern network devices which must maintain transfer rates in the gigabit range. There is therefore a need for a classifier that can quickly and efficiently process PDUs.

SUMMARY

The invention in some embodiments features a multi-stage classification method of matching a plurality of strings to one or more policies embodied in a plurality of stages. Each stage, preferably a table, comprises one or more entries, each entry comprising a criterion with which a string may be compared and a pointer to a subsequent stage to be used if the criterion in fact matches the string. The method preferably comprises the steps of generating a current pointer to a current stage with a current string; searching the one or more criteria in the current table by first comparing the current string to the criteria of one or more entries beginning with entries indicated by the one or more current pointers, defining the one or more current pointers equal to one or more new pointers, wherein each of the new pointers is associated with a criteria in the current stage that matches the current string, and incrementing the current stage and the current string, whereby the search is advanced to the next table; repeating the searching step for each of the plurality of stages; generating a score for each match identified in each of the plurality of stages; and selecting the policy of the one or more policies associated with a highest cumulative score, the cumulative score being the sum of the score for each match at each stage of the plurality of stages.

In the first preferred embodiment, the search precedes along one or more paths from table to table. Since the search is pursued for exact matches and wildcard, i.e., "don't care" matches, the search may identify a plurality of applicable rules. A "best rule" is selected from the plurality of applicable rules based upon cumulative scores generated for each policy.

In the second preferred embodiment, the search proceeds is executed on a single policy at any one time until all criteria are matched or the absence of a matched detected. In the absence of a match, the multistage classification method continues the search on the next viable policy. While the search generally precedes from a first hierarchical table to a last hierarchical table in a predetermined order, the method in this embodiment is adapted to recursively return to preceding tables to resume the search on a different policy. Scoring may be employed in the second preferred embodiment to prematurely terminate searches on one or more policies that can be determined in advance to be incapable or unlikely of returning a complete match.

BRIEF DESCRIPTION OF THE DRAWINGS

The present invention is illustrated by way of example and not limitation in the figures of the accompanying drawings, and in which.

DETAILED DESCRIPTION

Figure 1:
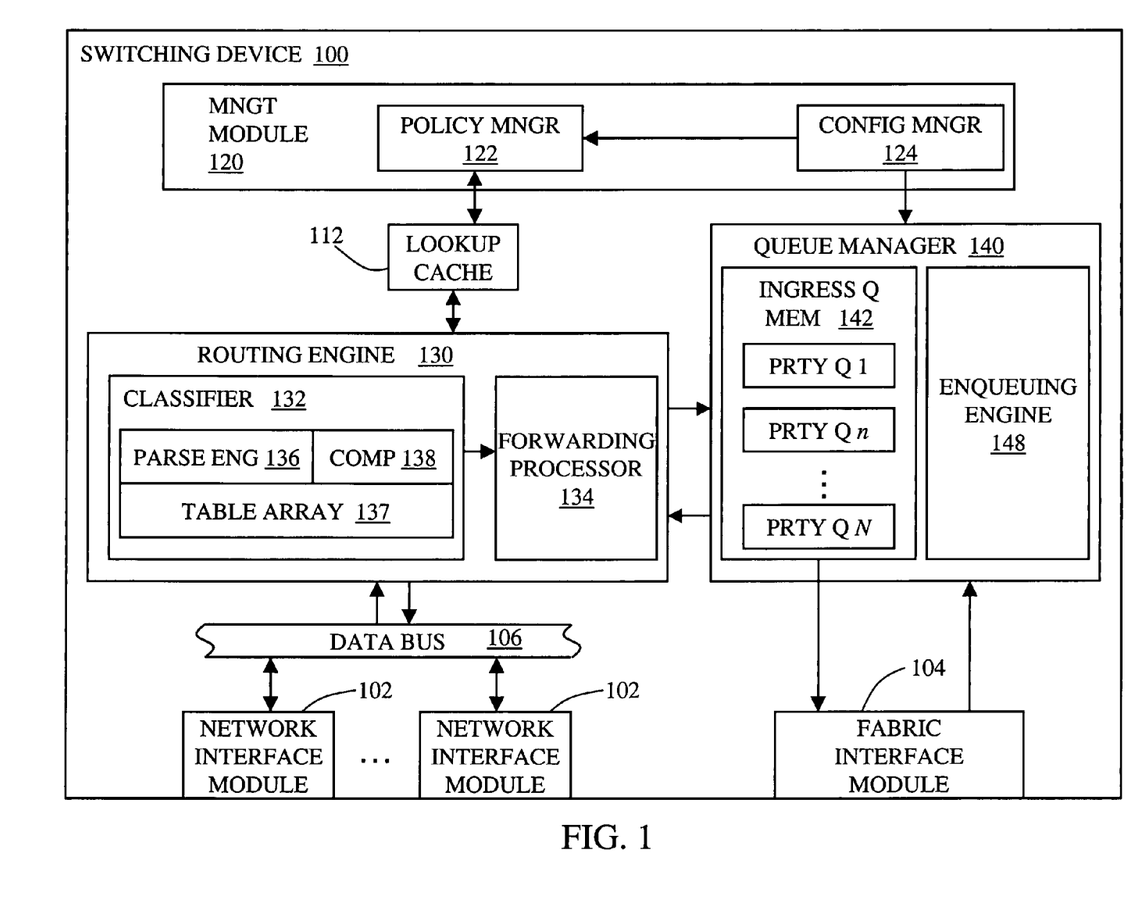
FIG. 1 is a functional block diagram of a switching module, according to the preferred embodiment of the present invention.

Illustrated in FIG. 1 is a functional block diagram of one of a plurality of switching devices of an enterprise switch with which the invention may be implemented. The switching device 100 is preferably one of a plurality of switching devices operatively coupled to one another via a common switch fabric (not shown). The switching device 100 is also operatively coupled to a plurality communications networks, such as an Internet Protocol (IP) network embodied in a local area network (LAN), wide area network (WAN), metropolitan area network (MAN), or a combination thereof, for example. Some embodiments of the present invention may also be employed with packet and frame processing in asynchronous transfer mode (ATM) switches and token ring switches.

The switching device 100 of the preferred embodiment comprises a plurality of network interface modules (NIMs) 102, one or more routing engines 130, a queue manager 140, a management module 120, and a fabric interface module 104. Each of the NIMs 102 includes at least one external port operatively coupled to a communications link for purposes of receiving/transmitting both ingress/egress data traffic. The NIMs 102 ports are preferably Ethernet-enabled with one or more Open Systems Interface (OSI) model with one or more media access control (MAC) interfaces. For purposes of this application, a traffic flow entering the switching device 100 at the NIMs 102 is referred to as ingress traffic and comprises ingress protocol data units (PDUs). A traffic flow entering the switching device 100 at the fabric interface module 104 and is exiting at a NIM 102 is referred to as egress traffic and comprises egress PDUs.

The ingress and egress PDUs are conveyed between the plurality of NIMs 102 and routing engine 130 via one or more internal data buses 106. The routing engine 130 of the preferred embodiment is a switch enabled with the Institute of Electrical and Electronics Engineers (IEEE) 802.1D standard and the transmission control protocol (TCP)/IP protocol suite. As such, the switching device 100 is generally capable of, but not limited to, layer 2 through layer 7 switching operations as defined in the Open Systems Interconnect (OSI) network model.

The routing engine 130 of the preferred embodiment comprises a classifier 132 and a forwarding processor that cooperate to parse ingress PDUs, perform address look up using rules defined in cache 112, for example, classify flows, and perform address swapping prior to enqueuing. In this embodiment, routing engine 130 also receives egress data from the fabric (not shown), via the fabric interface module 104, which is passed by the switching module 100 to the appropriate egress port 102. One skilled in the art will appreciate that the routing engine 130 is one of a class of processing resource with which the invention may be practiced, alternative processing resources including traffic classifiers, rate policers, accounting devices, editing devices, and address look-up devices.

In the preferred embodiment of the present invention, the multistage classifier 132 includes a parsing engine 136, a table array 137, and a comparator 138, which cooperate to characterize traffic flows and identify one or more applicable class of service (CoS)/quality of service (QoS) policies. The parsing engine 136 extracts a plurality of bit fields from the packet for purposes of identifying the appropriate policy. Each of the bit fields represents a "nibble," i.e., a binary string or character string, used to identify and classify an ingress PDU. In the preferred embodiment, the nibbles are extracted from the source and destination addresses, ingress and egress ports, and protocol type, for example.

The plurality of nibbles are then tested in the comparator 138 against a plurality of criteria retrieved from the table array 137. Based upon the applicable rule identified by the classifier 130, the forwarding processor 134 may drop the PDU, determine the next-hop address of the unicast packet or multicast packets, for example, and determine the appropriate priority.

The queue manager 140 then buffers the traffic in one of a plurality of ingress priority queues 1-N in ingress queue memory 142. Each of the priority queues 1-N is associated with a different level of priority corresponding to a different level of CoS/QoS. In the preferred embodiment, there are N=4 priority queues for each of the ports 102-104 of the switching device 100, although this is subject to variation depending on the application. When the bandwidth is available, the buffer PDU is then transmitted to the switch fabric via the fabric interface module 104.

The management module 120 generally comprises a policy manager 122 for retaining and implementing policy rules—including static addressing, filtering, and (CoS)/(QoS) policies—provided by a network administrator via a configuration manager 124. A local, high speed copy of the policies are preferably retained in high speed look-up cache 112 to provide real-time support for the routing engine 130 operating a wire speeds.

Figure 2:
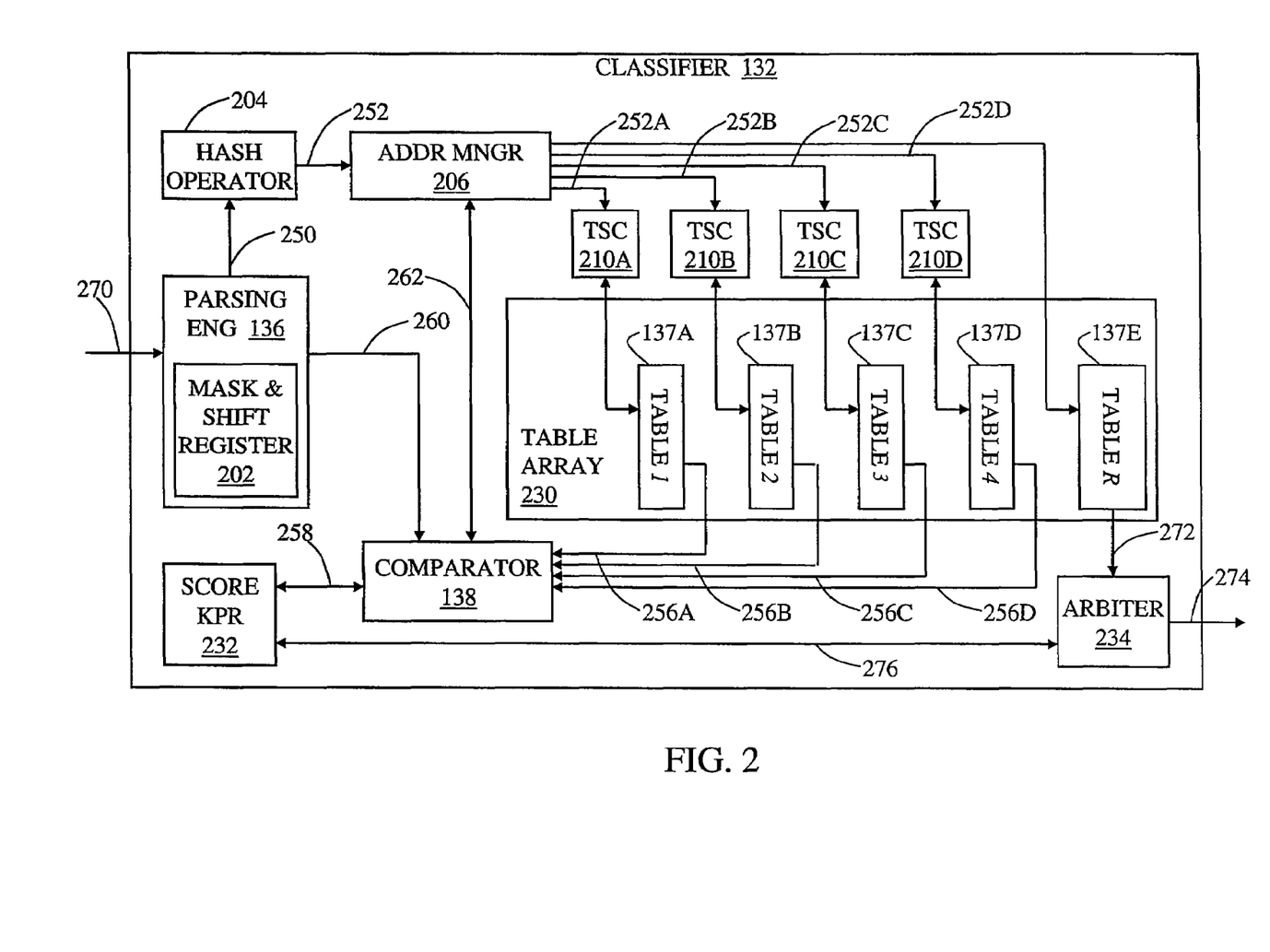
FIG. 2 is a detailed functional block diagram of the multistage classifier, according to the preferred embodiment of the present invention.

Illustrated in FIG. 2 is a detailed functional block diagram of the multistage classifier 132 for performing fast and accurate classification of ingress traffic. Upon receipt of a PDU 270, the parsing engine 136 inspects the PDU and extracts a plurality of nibbles. In the preferred embodiment, a total of four nibbles are extracted to perform CoS/QoS, although the invention may be implemented with more or less nibbles. Each of the nibbles comprises one or more bits selected from the PDU, including any of the following packet fields:

1. source address;

2. destination address;

3. input port 102-104 on which the packet was received;

4. source transmission control protocol (TCP) port or user datagram port (UDP);

5. destination transmission control protocol (TCP) port or user datagram port (UDP);

6. layer 3 or layer 4 packet type;

7. TCP acknowledgement flag;

8. acknowledgement bit;

9. type of service value; and 10. payload.

The nibbles are generally extracted from the packet 270 with a mask & shift register 202 well known to those skilled in the art. The mask & shift register 202 is preferably adapted to programmably modify the number, location, and size of the plurality of nibbles so as to provide maximal flexibility in identifying and selecting traffic flows.

In some embodiments, a first nibble 250 is conveyed to the hash operator 204 that generates a key 252, an index or a pointer, used by the address manager 206 to expedite the search conducted at the first hierarchical table 137A. In parallel, each of the one or more nibbles 260 is conveyed to the comparator 138 where they will be used to test for matches in table array 230.

Upon receipt of the key 252, a first table search controller (TSC) 210A initiates a search of the first hierarchical table 137A. The TSC 210A, as well as TSC 210B-210D, are adapted receive one or more pointers into the associated hierarchical table and autonomously read out one or more criteria retained in the associated hierarchical table. With respect to TSC 210A, the key 252 points to the first of at least one entry in the first hierarchical table 137A that is searched and "matched" to the first nibble to test if an associated policy is applicable. The TSCs 210A-210D in conjunction with the respective hierarchical tables 137A-137D represent the four stages of the multistage classifier of the preferred embodiment. A symbolic representation of the criteria that populate the first hierarchical 137A, as well as the second through fourth hierarchical tables 137B-137D, is shown in FIG. 3.

A criterion from a hierarchical table is said to "match" a nibble if the associated operation yields or true answer. In the preferred embodiment, a match may be true if the criterion value and the value of the nibble against which it is tested are equal or the criterion is a wildcard, i.e., a "don't care" test, that is generally satisfied by any nibble. A criterion may also qualify as a match if an associated logical operation yields a true answer, with example operations comprising: (a) Boolean operations including NOT, AND, and OR; (b) relational operations including =, < >, <, <=, >, >=; string operations including LIKE and NOTLIKE; and (c) set operations including IN, NOTIN, for example.

Figure 3:
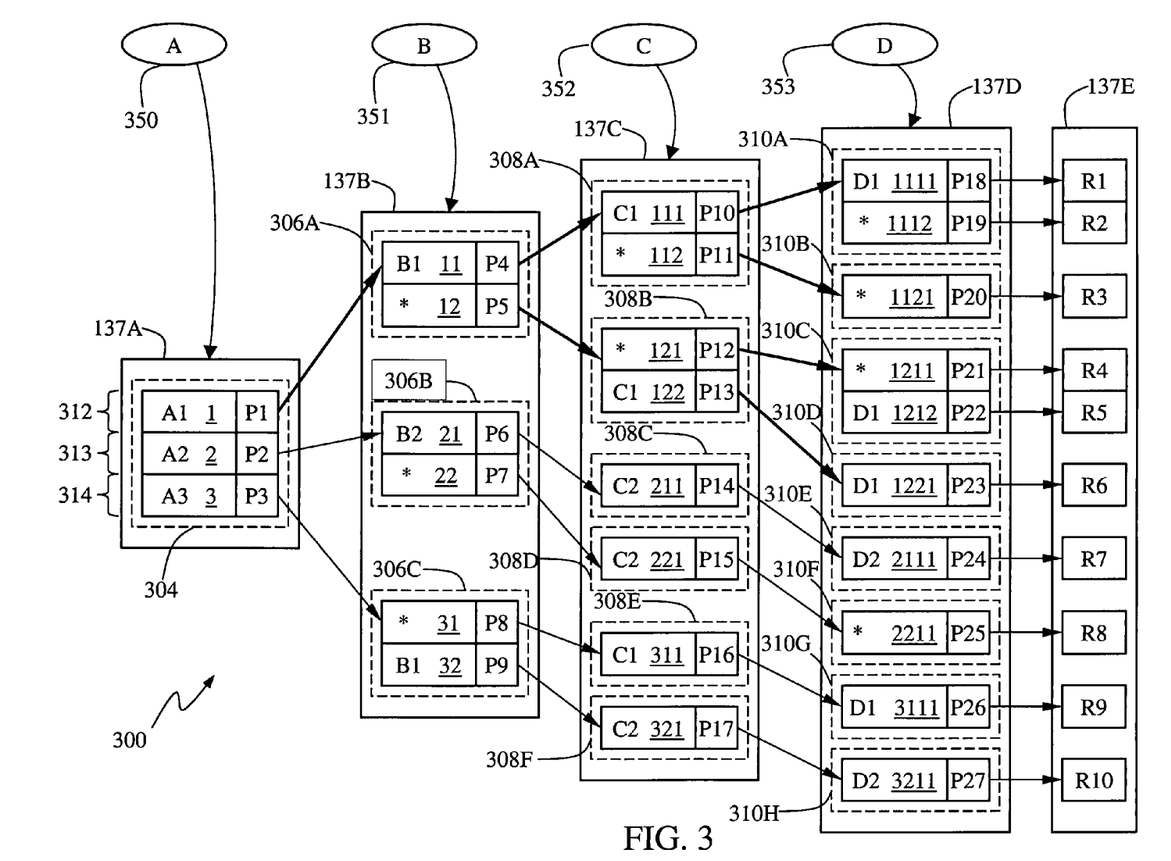
FIG. 3 is a organizational representation of the plurality of hierarchical tables populated with the classification criteria, according to the preferred embodiment of the present invention.

Illustrated in FIG. 3 is a representation of the plurality of hierarchical tables 137A-137D populated with symbolic classification criteria against which the plurality of nibbles extracted from a PDU are compared. In the preferred embodiment, there are four hierarchical tables 137A-137D that are examined in order. The classification criteria of hierarchical tables 137A-137D are logically organized in what resembles, but is different from, a binary-trie in which each successive table corresponds to a different nibble. Each of the hierarchical tables 137A-137D comprises one or more criterion groups, each criterion group comprising one or more entries, each entry comprising a criterion and a pointer. The criteria in the preferred embodiment represents a possible value of the associated nibble 350-353 while the pointer provides a key into a subsequent table. The final table, rules table 137E, in turn, retains the packet processing rule selected upon completion of the search of hierarchical tables 137A-137D in the manner described herein. Each of the tables 137A-137E may be organized into one or more physical memory devices, including random access memory (RAM), dynamic RAM (DRAM) and/or static RAM (SRAM), for example.

In the preferred embodiment, the first criterion group 304 comprises three criterion-pointer entries 312, 313, 314. The data represented by A1 in a first entry 312, A2 in a second entry 313, and A3 in a third entry 314 of the hierarchical table 137A are the criteria against which a first nibble, A 350, may be compared. Similarly, hierarchical table 137B comprises the criteria, organized into one or more the criterion groups 306A-306C, against which a second nibble, B 351, is compared; hierarchical table 137C comprises criteria, organized into one or more the criterion groups 308A-308F, against which a third nibble, C, is compared; and hierarchical table 137D comprises further criteria, organized into one or more the criterion groups 310A-310H, against which a fourth nibble, D 353, is compared. Associated with each of the criterion is a pointer which, if the criterion matches the nibble, may be used as an index into the subsequent table. For example, the pointer P1 may be used as a key to a subsequent criterion group 306A if the nibble A 350 matched the criterion A1, pointer P2 serves as a key to a second criterion group 306B if the nibble A matched criterion A2, and pointer P3 may be used as a key to a third criterion group 306C if the nibble A matched criterion A3.

Referring to FIG. 2 simultaneously, the first TSC 210A uses the key 252 as a pointer into the first entry 312 of the first table 137A. Beginning with first criterion A1 of entry 312, the TSC 210A sequentially reads out one or more criteria from the first criterion group 304. The criterion A1 is passed via a first table to comparator line 256A to the comparator 138 where it is tested against the first nibble, A. Assuming the first nibble does not equal criterion A1, the TSC 210A proceeds to retrieve the next criterion A2 which is also compared to the first nibble A. The process is repeated until the last entry of the criterion group 304 is reached. In the absence of a match, the PDU is generally filtered.

If, however, one or more matches are detected between the first nibble and the criteria of the first criterion group 304, the comparator 138 retrieves each pointer associated with the matched criterion needed as an index into the next hierarchical table. For example, if the first nibble A 350 matched the criterion A1, the associated pointer P1 is passed from the comparator 138 to the address manager 206 and then to the second TSC 210B. The second TSC 210A uses the pointer P1 as a key into the first entry of a criterion group, namely group 306A, of the second hierarchical table 137B. The criteria of the criterion group 306A are sequentially read out to the comparator 138 via a second table to comparator line 256B for purposes of detecting a match with the second nibble B 351. If second nibble B equals B1, for example, the match causes the associated pointer P4 to be passed by the comparator 138, to the address manager 206 and then to the third TSC 210C.

The process by which one or more pointers are retrieved from a preceding hierarchical table to identify one or more entries to search in a current hierarchical table to, in turn, retrieve one or more pointers into the subsequent hierarchical table is repeated at each subsequent hierarchical table 137C, 137D using read outs via the third table to comparator line 256C and fourth table to comparator line 256D until a rule or pointer to rule of rules table 137E is retrieved. While the number of tables is subject to vary, one skilled in the art will recognizes that there is a generational relationship between successive tables defined by the order of the search. With the exception of the first hierarchical table, each hierarchical table is a child hierarchical table with respect to an immediately preceding parent hierarchical table. With the exception of the last hierarchical table, each hierarchical table is a parent hierarchical table with respect to an immediately subsequent hierarchical table.

In a first preferred embodiment of the multistage classifier, multiple matching criteria of each of one or more criterion groups are tracked and the search continued in the tables 137A-137D across one or more paths. If each of these paths yields a complete match, there is a possibility of multiple competing rules being identified in rules table 137E. Assuming for purposes of illustration that a PDU characterized by four nibbles A1.B1.C1.D3 is searched over the classification tables 137A-137D as populated in FIG. 3, there will be three rules retrieved, namely R2, R3, and R4.

When a match is detected or a constraint otherwise satisfied, the comparator 138 communicates a match detection signal 262 to the address manager 206, the signal 262 comprising the pointer associated with the criterion matched. For example, the comparator 138 transmits the pointer P1 to the address manager 206 if the criterion A1 is matched. The comparator 138 also communicates a match-type signal 258 to the score keeper 232 where each match detected is scored and recorded. In general, a wildcard match is score one point less than an exact match. In this embodiment, an exact match between the nibble and the criterion is scored with a value of two, a wildcard match is scored with a value of one, and no match scored a zero. In the preferred embodiment, separate cumulative scores are maintained for each path traversed from the first hierarchical table 137A to the last hierarchical table 137D.

One skilled in the art will appreciate that the first substring of a next PDU may be initiated concurrently with the search of the second substring of a current packet since the search over the first table 137A can occur in parallel with and independent of the search in the second table 137B. The technique employed in some embodiments may be referred to as "pipelining."

Beginning with the value pointed to by pointer P1, the search over the criterion group 306B continues until each criteria contained therein is evaluated. In the some embodiments, the end of a criterion group is signified by an end-of-group marker, preferably a flag than is integrated into the table memory. The flag may be inserted into an entry or succeed the last entry of the group. In other embodiments, the depth of each group is recorded in a register that is consulted by the corresponding TSC.

Upon detection of one or more matches for the second nibble, the comparator 138 will transmit each of the associated pointers to the address manager 206 which, in turn transmits the pointers to the next TSC of the next hierarchical table. In this example, the criterion B1 yields an exact match of the nibble B=B1. The comparator 138 also detects a match between the nibble B1 and the "don't care" criterion 12, indicated by "*". As such, the pointer P4 for the exact match and pointer P5 associated with the wildcard are transmitted to the address manager 206. In the preferred embodiment, the cumulative scores are maintained for each matching path through the table array 230. With the exact match and wildcard being awarded two points and one point, respectively, the path A1.B1 will have associated with it a present cumulative score of four and the path A1.* with a present cumulative score of three.

A search is then conducted for nibble C1 in each of the criterion groups 308A, 308B pointed to in the second hierarchical table 137B. In this embodiment, the match of nibble C1 in the third hierarchical table 137C with criterion C1 111 and wildcard criterion 112 of the criterion group 308A as well as the wildcard criterion 122 and criterion C1 122 of criterion group 308B, each of the pointers P10-P13 is transmitted to the address manager 206 and to the next TSC 210D. The current scores are as follows: path A1.B1.C1 is six, path A1.B1.* is five; path A1.*.* is four, and path A1.*.C1 is five.

Using the pointers P10-P13 as keys, the TSC 210D causes criterion groups 310A-310D to be read out to the comparator 138 and tested against the nibble D3. Only the wildcard criteria 1112, 1121, 1211 are matches in the present example. The search therefore yields the resulting pointers P19-P21 that provide links to the associated rules table 137E. The associated rules R2-R4 are therefore the resulting candidate rules from which the switching device 100 must select the most suitable rule. The final one or more rules 272 are then communicated to an arbitrator 234. If there are two or more competing rules, the arbiter 234 consults the score keeper 232 and outputs 274 the rule associated with the highest scoring path 276. In the present example, the path A1.B1.C1.* associated with rule R2 has a cumulative score of seven, path A1.B1.*.* associated with rule R3 has a cumulative score of six, and path A1.*.*.* associated with rule R4 yields a score of five. Rule R2 is therefore selected by arbiter 234 as the most suitable rule.

One skilled in the art will recognize that, like other classification/routing devices, it is important that the rules be unambiguous and define a unique "best match" for each PDU. While it is common to have multiple rules of different scope, the scoring arrangement should be structured such that potentially conflicting rules are awarded different scores and lead to a difference in precedence. For example, a policy with criteria A1.B1.*.* has a narrower scope than a policy with criteria A1.*.*.* and should be given a higher score to prevent the latter rule from effectively nullifying the former.

Figure 4:
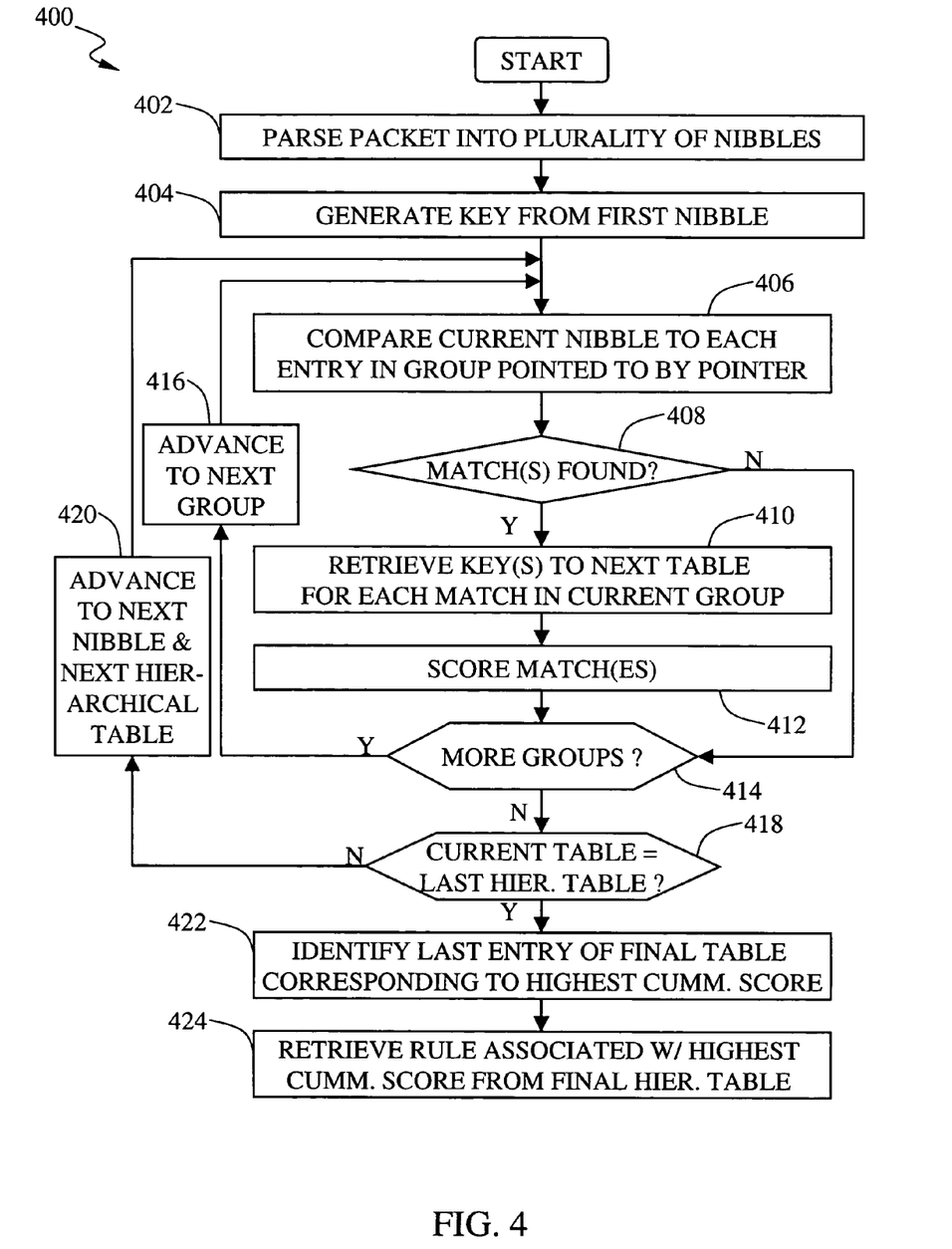
FIG. 4 is a flow chart of the multistage classification method of selecting the optimal classification rule, according to the first preferred embodiment.

Illustrated in FIG. 4 is a flow chart of the multistage classification method of selecting the optimal classification rule, according to the first preferred embodiment. The method 400 begins in the parsing step 402 by extracting the plurality of nibbles from the PDU. A first nibble is selected for purposes of generating a key step (step 404) into the first table. In the key generating step 404 of the preferred embodiment, the key is formed by hashing the nibble using any one of a number of hashing techniques known to those skilled in the art.

The nibble is then compared against one or more entries in a criterion group in the nibble comparing step 406. In the first iteration through the comparing step 406, a current nibble, i.e., the first nibble, is compared against the one or more criteria of the criterion group pointed to by the key. If one or more matches are detected 408, the pointer associated with each matching criterion is retrieved from the matching entry (step 410). If the match recognizes wildcards and or operands, a plurality of matches may be detected and a plurality of pointers retrieved. The quality of the match is accessed and recorded (step 412) as a function of each path between the first hierarchical table 137A and last hierarchical table 137D. After matching and scoring the zero or more criteria of the current criterion group, the method 400 proceeds to the group testing step 414. If there are additional criterion groups to test, indicated by one or more additional pointers into the current hierarchical table, the group testing step 414 is answered in the affirmative and the method 400 advances to the next criterion group of the current hierarchical table (step 416). The method 400 proceeds to search for matches in each criterion group of the current hierarchical table until the last criterion group is searched, at which point group testing step 414 is answered in the negative.

Until the last hierarchical table is reached, the table testing step 418 will be answered in the negative and the current hierarchical table incremented or otherwise advanced to a next hierarchical table where the next nibble is searched (step 420). As before, the nibble is compared against substantially all criteria of a criterion group (step 406), the pointer(s) retrieved for each current match identified (step 410), and the cumulative path scored (step 412) for each criterion group indicated by a preceding matching entry pointer determined in the previous iteration. The method 400 executes this search for each hierarchical table until the last hierarchical table is completed.

Upon completing the search of the last hierarchical table, the table testing step 418 is answered in the affirmative. At that point, all cumulative scores will have been generated for each complete path, if any, corresponding to a match of every nibble of the original PDU. In the first preferred embodiment, this includes both exact, "don't care" matches, and Boolean matches, for example. The entry corresponding to the highest-scoring path is selected (step 424) from the set of scored paths. A rule pointer is then retrieved from the entry of the last hierarchical table, e.g., fourth table 137D, for the path with the highest cumulative score (step 424). The rule from the rules table 137E corresponding to the rule pointer is then forwarded to the forwarding processor 134 for purposes of processing the ingress PDU consistent with the terms of the rule set forth therein.

Figure 5A:
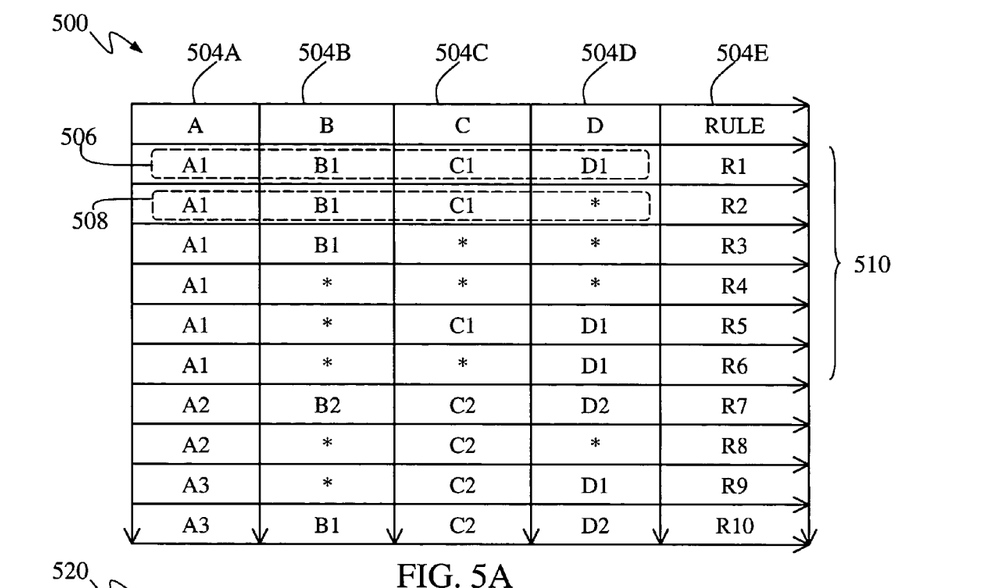
FIG. 5A is a table comprising the plurality of policies of the hierarchical tables of FIG. 3, according to the first preferred embodiment.

Illustrated in tabular form in FIG. 5A are the plurality of policies of the hierarchical tables 137A-137D. The columns 504A-504D of the policies table 500 correspond to the criteria of the hierarchical tables 137A-137D, respectively, while the final column 504E corresponds to the rules table 137E. Each of the cells of columns 504A-504D symbolically represents a criterion which may be compared against a nibble. A row therefore represents a policy whose criteria must necessarily be matched before the corresponding rule in column 504E can be applied.

In accordance with the first embodiment, there are circumstances in which a PDU will qualify under a plurality of rules. This typically arises where, for example, a "wildcard," i.e., a "don't care," is used as a parameter instead of a numerical value. For example, the PDU having nibbles values A1.B1.C1.D1 qualifies for classification under the first policy 506 and a second policy A1.B1.C1.* 508 as well as each of the other policies associated with right-side bracket 510. Since the policies for each of the six classes 510 dictated different rules, namely R1 through R6, respectively, it is clearly necessary to distinguish the most suitable class under which the packet should be assigned. The score keeping of the preferred embodiment permits one to quantitative choose the most suitable rule from a plurality of rules.

Figure 5B:
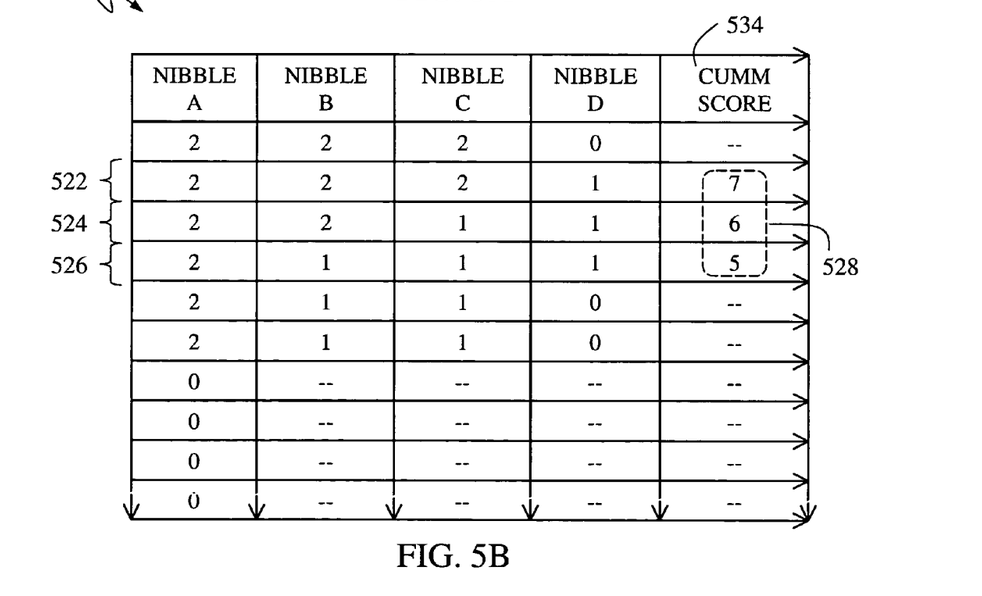
FIG. 5B is a table comprising the numerical scores corresponding to the plurality of policies set forth in FIG. 5A given a PDU comprising nibbles "A1.B1.C1.D3.

Illustrated in FIG. 5B is a scorecard in the form of a table comprising the numerical scores given the PDU "A1.B1.C1.D3" and the criteria of each of the policies in table 500. In the present example, an exact match between a nibble and a criterion is awarded two points, a wildcard match awarded one point, and non-match equal zero. A hyphen signifies that the search on the criterion was abandoned at a preceding node within a hierarchical table due to the absence of a match. A cumulative score is generated in the preferred embodiment for each of the candidate rules, i.e. a policy for which a match was detected at each criteria.

As illustrated by the cumulative score column 534, a PDU A1.B1.C1.D3 yields only three candidate rules from which to choose, those rules corresponding to the three scores 528. Policy 522 scores a seven under rule R2, policy 524 scores a six, and policy 526 scores a five. In the preferred embodiment, each of these scores is maintained by the score keeper 232 until the last hierarchical table 137D is searched. In the presence of a plurality of candidate policies, the arbitrator 234 selects policy 522 as the highest scoring candidate. As a result, the PDU A1.B1.C1.D3 is processed in accordance with the rule R2.

Figure 6:
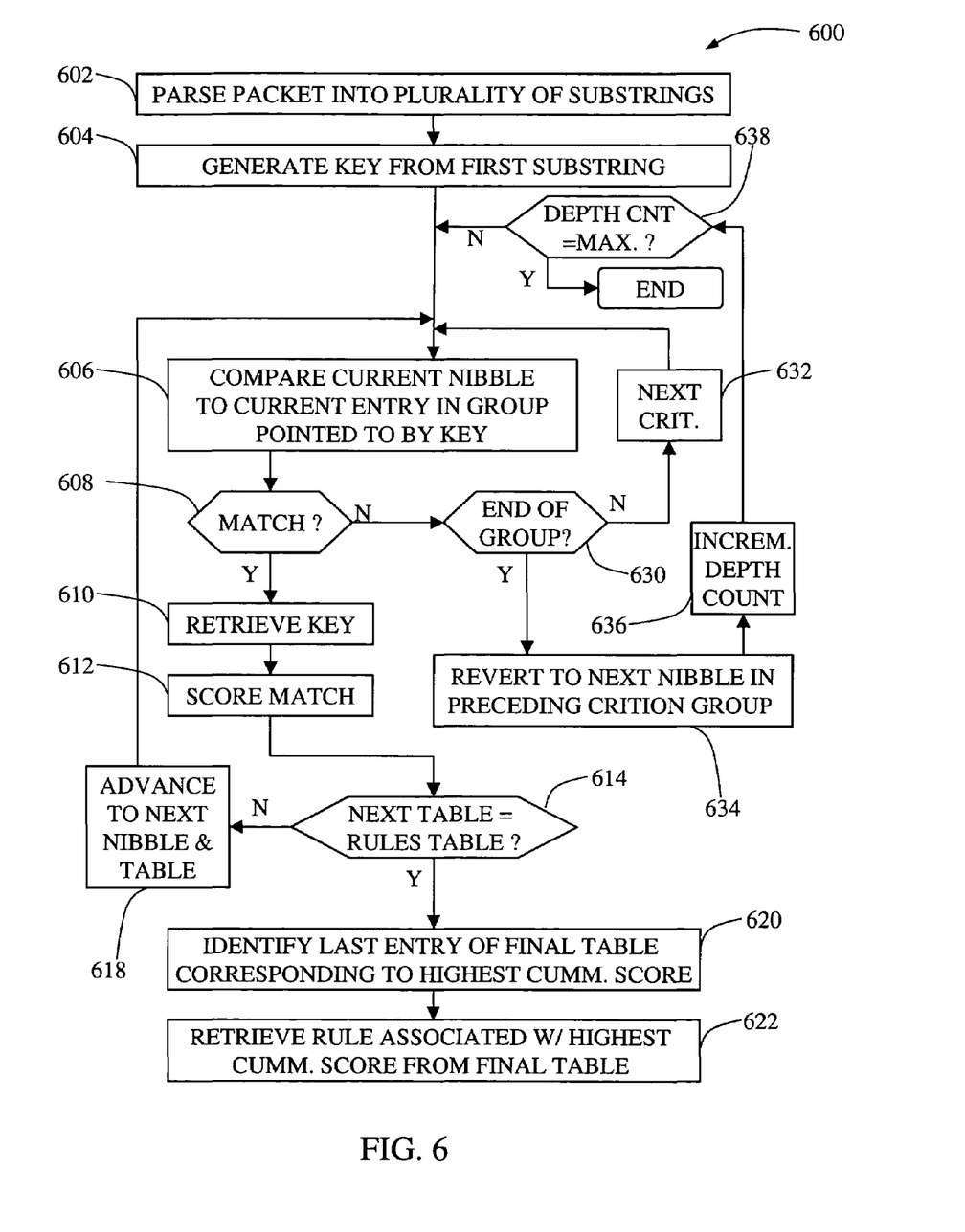
" and FIG. 6 is a flow chart of the hierarchical multistage classification method of selecting an optimal classification rule, according to the second preferred embodiment.

Illustrated in FIG. 6 is a flow chart of the hierarchical multistage classification method of selecting the optimal classification rule according to the second preferred embodiment. The search scheme of the second embodiment differs from the first embodiment in that the search in a criterion group preferably continues only until an exact match is found and the search completed within a criterion group only when the match fails in the present criterion group or recursive processing is invoked. As soon as an exact match is found with the particular nibble, the search proceeds to the next table using the pointer associated with the exact match. If and when a search fails in a child hierarchical table, the search recursively resumes the search within a criterion group prematurely terminated earlier in a parent hierarchical table. If matches of different levels of priority are included in the search, the paths may be scored in order to quantitatively rank them. In this embodiment, there are generally a plurality of hierarchical table paths searched, although number searched is narrower than in the first embodiment.

The method 600 begins in the parsing step 602 by extracting the plurality of nibbles from the PDU. A first nibble is selected for purposes of generating a key into the first table. In the key generating step 604 of the preferred embodiment, the key is formed by hashing the nibble using any of a number of hashing techniques known to those skilled in the art.

The nibble is then compared against the current criterion of the current criterion group in the nibble comparing step 606. In the first iteration through the comparing step 606, the first nibble is compared against the first criterion of the first criterion group pointed to by the key. In this embodiment, a single a criterion is tested at a time. If a match is detected (step 608), the pointer associated with the matching criterion is retrieved from the matching entry (step 610). The quality of the match is accessed and recorded (step 612) as a function of the path between the first hierarchical table 137A and last hierarchical table 137D. After matching and scoring the criterion of the current criterion group, the classification method 600 proceeds to test the next nibble at the next hierarchical table (step 618) as long as there are hierarchical tables to be search searched (step 614). If a match is detected at each of the subsequent child hierarchical tables, the rules table testing step 614 will eventually be answered in the affirmative and the method 600 will use the pointer corresponding to the matching entry of the final hierarchical table (step 620) to retrieve the associated rule applied to the PDU (step 622).

If the current criterion does not match the current nibble in matching test 608, and the criterion is not the last entry in the current criterion group, the method advances to the next criterion (step 632) within the group. If at some point each of the criteria of a criterion group is tested and fails, the end-of-group test (step 630) will be answered in the negative and the method 600 will recursively continue the search from a previous node in the search trie. In the present embodiment, the failure to find a suitable match or path in one criterion group causes the search to revert to the former criterion group in the parent hierarchical table (step 634). At the former criterion group, the search resumes with the next criterion following the criterion that yielded the pointer to the table just searched.

In some embodiments, the number of times that the classification method reverts to a preceding parent hierarchical table is monitored by what is termed a depth count. The depth count is preferably incremented (step 636) each time the method 600 recursively restarts the search by revisiting a preceding parent hierarchical table. Once the depth count reaches a predetermined number, e.g. four, the search may be automatically terminated and the PDU filtered or trapped. If trapped, the PDU may undergo further processing including, but not limited to, "source learning" implemented in software to determine the origin of the PDU. Depending on the outcome of the source learning, the rules may be further re-organization, as well as the tables 137A-137E.

In some embodiments, a score threshold is used as a mechanism to prematurely terminate searches across undesirable paths in the hierarchical tables. The score maintained by the score keeper 232 may, for example, be compared against the score threshold for purposes of terminating an otherwise valid search where the anticipated cumulative score cannot exceed the threshold. If, for example, the matches on the first two hierarchical tables was so low that even exact matches found in the last two tables would be insufficient to bring the cumulative score over the score threshold, the search over that branch of the trie would be terminated, thus making the search more efficient by avoiding the unnecessary consumption of resources.

One skilled in the art will appreciate that the search algorithms of the present invention, including the first and second embodiments presented above, may be applied to address look-up in both Ipv4 and Ipv6 environments featuring the longest prefix matching (LPM), QoS and CoS classification, policing, shaping, and numerous other binary searches involving a plurality of nibbles or alphanumeric strings more generally. The invention may also be employed in hardware, software, firmware, or a combination thereof, including but not limited to application-specific integrated circuits (ASICs) such as a content addressable memory (CAM) chip or ternary CAM (TCAM) chip.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A multi-stage classification method of matching a plurality of strings to one or more policies embodied in a plurality of stages, each stage comprising one or more entries, each entry comprising a criterion and a pointer to a subsequent stage; the method comprising the steps of:
   (a) generating a current pointer to a current stage using a current string;
   (b) searching one or more criteria in the current stage, the searching step further comprising the steps of:
      (i) comparing the current string to the criteria of one or more entries beginning with entries indicated by the one or more current pointers,
      (ii) defining the one or more current pointers equal to one or more new pointers, wherein each of the new pointers is associated with a criterion in the current stage that matches the current string, and
      (iii) incrementing the current stage and the current string;
   (c) repeating the searching step for each of the plurality of stages;
   (d) generating a score for each match identified in each of the plurality of stages; and
   (e) selecting the policy of the one or more policies associated with a highest cumulative score, the cumulative score being the sum of the score for each match at each stage of the plurality of stages.

2. The multi-stage classification method of claim 1, wherein each of the plurality of stages comprises a hierarchical table, wherein each hierarchical table comprising criteria associated with the one or more policies.

3. The multi-stage classification method of claim 2, wherein the criteria are arranged in one or more criterion groups, wherein each criterion of a criterion group in a child hierarchical table shares a common criterion in a parent hierarchical table.

4. The multi-stage classification method of claim 3, wherein the step of comparing the current string to the criteria of one or more entries is limited to the criteria of one or more criterion groups beginning with entries indicated by the one or more current pointers.

5. The multi-stage classification method of claim 1, wherein the one or more criteria comprise one or more numerical values.

6. The multi-stage classification method of claim 5, wherein the one or more criteria comprise one or more wildcard operators.

7. The multi-stage classification method of claim 5, wherein the one or more criteria comprise one or more logical operations.

8. The multi-stage classification method of claim 7, wherein the one or more logical operations are selected from the group consisting of: Boolean operations, relational operations, string operations, set operations, and a combination thereof.

9. The multi-stage classification method of claim 6, wherein wildcard operators are assigned a lower score than the score assigned to an exact match with a numerical value.

10. The multi-stage classification method of claim 1, wherein the current pointer of the current pointer generating step is generated by hashing the first string of the plurality of strings.

11. The multi-stage classification method of claim 1, wherein the plurality of strings comprise a plurality of nibbles derived from a protocol data unit (PDU).

12. The multi-stage classification method of claim 11, wherein the plurality of nibbles are selected from one or more fields of the PDU, the fields being selected from the group consisting of: source address, destination address, input port on which the PDU was received, source transmission control protocol (TCP) port, source user datagram port (UDP), destination UDP, layer 3 packet type, layer 4 packet type, TCP acknowledgement flag, acknowledgement bit, type of service value, and PDU payload.

13. The multi-stage classification method of claim 3, wherein the step of comparing comprises comparing the current string to the criteria of one or more entries until a match is detected.

14. The multi-stage classification method of claim 13, wherein the method further includes a reverting step, subsequent to the searching step and prior to the repeating step, comprising:
   (a) decrementing the current stage and the current string, whereby searching may return to a preceding criterion group of a preceding hierarchical table,
   (b) selecting a criteria of said preceding criterion group not previously compared with the current string, and
   (c) resuming the searching step.

15. The multi-stage classification method of claim 14, wherein the reverting step further includes the step of incrementing a depth counter.

16. The multi-stage classification method of claim 15, wherein the method terminates if the depth counter has been incremented a predetermined number of times.

17. The multi-stage classification method of claim 13, wherein the searching step further includes the step of:
   (a) generating an estimated cumulative score at an intermediate hierarchical table,
   (b) determining whether the estimated cumulative score could satisfy a predetermined score threshold, and
   (c) ending the searching step if the estimated cumulative score could not satisfy the score threshold.

18. The multi-stage classification method of claim 1, wherein the number of stages is greater than two.

19. The multi-stage classification method of claim 1, wherein the pointer in a last hierarchical table associated with the selected policy points to an action in a rules table.

20. The multi-stage classification method of claim 11, wherein one or more of the plurality of nibbles is extracted from a PDU Internet Protocol (IP) version 4 or IP version 6 address.

21. A multi-stage classification method of selecting a policy from a plurality of policies based upon a plurality of protocol data unit (PDU) nibbles, the plurality of policies being embodied in a plurality of hierarchical tables, the plurality of hierarchical tables comprising a first table and one or more child tables, the method comprising the steps of:
   (a) generating, from a first nibble, a first pointer to a first table of a plurality of tables that embody the policies, each table comprising one or more criteria and associated pointer;
   (b) comparing the first nibble with each of the one or more criteria of the first table beginning with the criterion indicated by the first pointer;
   (c) identifying one or more matches between the first nibble and one or more associated pointers to a child table;
   (d) searching a current child table with a current nibble from the plurality of nibbles, the searching step further comprising:
      (i) comparing the current nibble with one or more criteria of the child table, beginning with the criteria indicated by each of the one or more pointers obtained in a previous identifying step, and (ii) identifying one or more matches between the current nibble and one or more pointers to a next child table, each pointer associated with a match;
(e) repeating the searching step for each child table of the plurality of tables;
(f) determining a score for each match identified in each hierarchical table; and
(g) selecting the policy of the one or more policies associated with a highest cumulative score, the cumulative score being the sum of the scores for each match at each of the plurality of hierarchical tables.

22. The multi-stage classification method of claim 21, wherein the criteria of each hierarchical table are arranged in one or more criterion groups, wherein each criterion of a criterion group in a child hierarchical table shares a common criterion in an associated parent hierarchical table.

23. The multi-stage classification method of claim 22, wherein the step of comparing the current nibble with one or more criteria of the child table is confined to the criteria of one or more criterion groups beginning with the criteria indicated by each of the one or more pointers obtained in a previous identifying step.

24. A multi-stage classification method of selecting a policy from a plurality of policies based upon a plurality of protocol data unit (PDU) nibbles, the plurality of policies being embodied in a plurality of hierarchical tables, the plurality of hierarchical tables comprising a first table and one or more child tables, the method comprising the steps of:
(a) generating, from a first nibble, a first pointer to a first table of a plurality of tables that embody the policies, each table comprising one or more criteria and associated pointer;
(b) comparing the first nibble with each of the one or more criteria of the first table beginning with the criterion indicated by the first pointer;
(c) identifying one or more matches between the first nibble and one or more associated pointers to a child table;
(d) searching a current child table with a current nibble from the plurality of nibbles, the searching step further comprising:
(i) comparing the current nibble with one or more criteria of the child table until a match is detected, beginning with the criteria indicated by each of the one or more pointers obtained in a previous identifying step, and
(ii) identifying a pointer to a next child table associated with the match;
(e) if no match is detected in the search step:
(i) reverting to the previous table, and
(ii) resuming the searching step; and
(f) repeating the searching step for each child table of the plurality of tables until a policy is matched;
wherein the method further includes the step of determining a score for each match identified in each hierarchical table.

25. The multi-stage classification method of claim 24, wherein the criteria of each hierarchical table are arranged in one or more criterion groups, wherein each criterion of a criterion group in a child hierarchical table shares a common criterion in an associated parent hierarchical table.

26. The multi-stage classification method of claim 24, wherein the step of comparing the current nibble with one or more criteria of the child table is restricted to the criteria of one or more criterion groups beginning with the criteria indicated by each of the one or more pointers obtained in the previous identifying step.

27. A multi-stage classifier for matching a plurality of strings to one or more policies embodied in a plurality of stages, each stage comprising one or more entries, each entry comprising a criterion and a pointer to a subsequent stage; the classifier being adapted for:
(a) generating a current pointer to a current stage using a current string;
(b) searching one or more criteria in the current stage, the searching step further comprising the steps of:
(i) comparing the current string to the criteria of one or more entries beginning with entries indicated by the one or more current pointers,
(ii) defining the one or more current pointers equal to one or more new pointers, wherein each of the new pointers is associated with a criteria in the current stage that matches the current string, and
(iii) incrementing the current stage and the current string;
(c) repeating the searching step for each of the plurality of stages;
(d) generating a score for each match identified in each of the plurality of stages; and
(e) selecting the policy of the one or more policies associated with a highest cumulative score, the cumulative score being the sum of the score for each match at each stage of the plurality of stages.

\* \* \* \* \*